Figure 7:
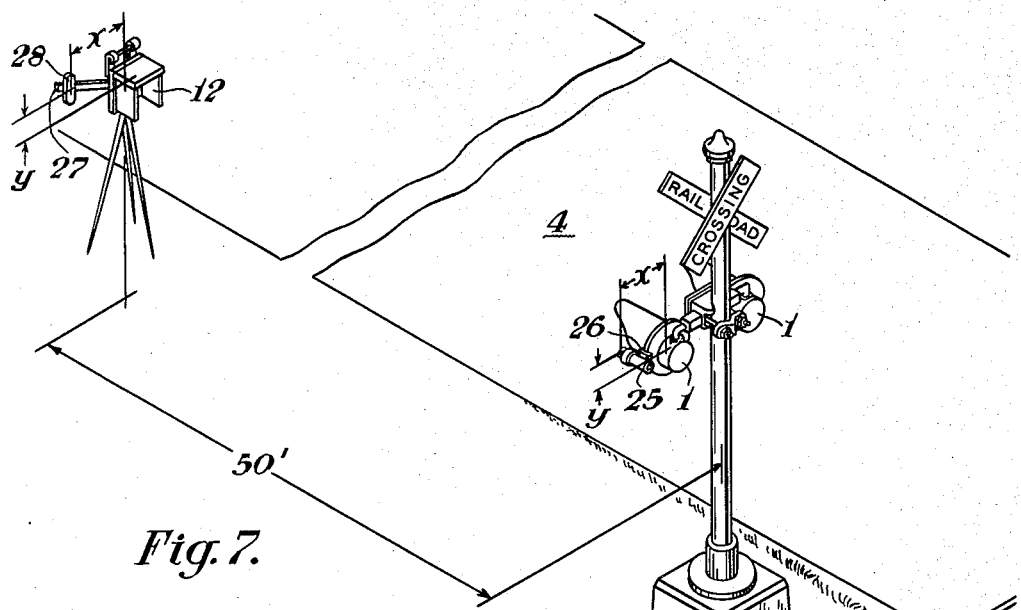

Aug. 29, 1950     W. B. WELLS     2,520,866
METHOD OF ALIGNING HIGHWAY CROSSING SIGNAL LAMPS
Filed March 27, 1948     4 Sheets-Sheet 1
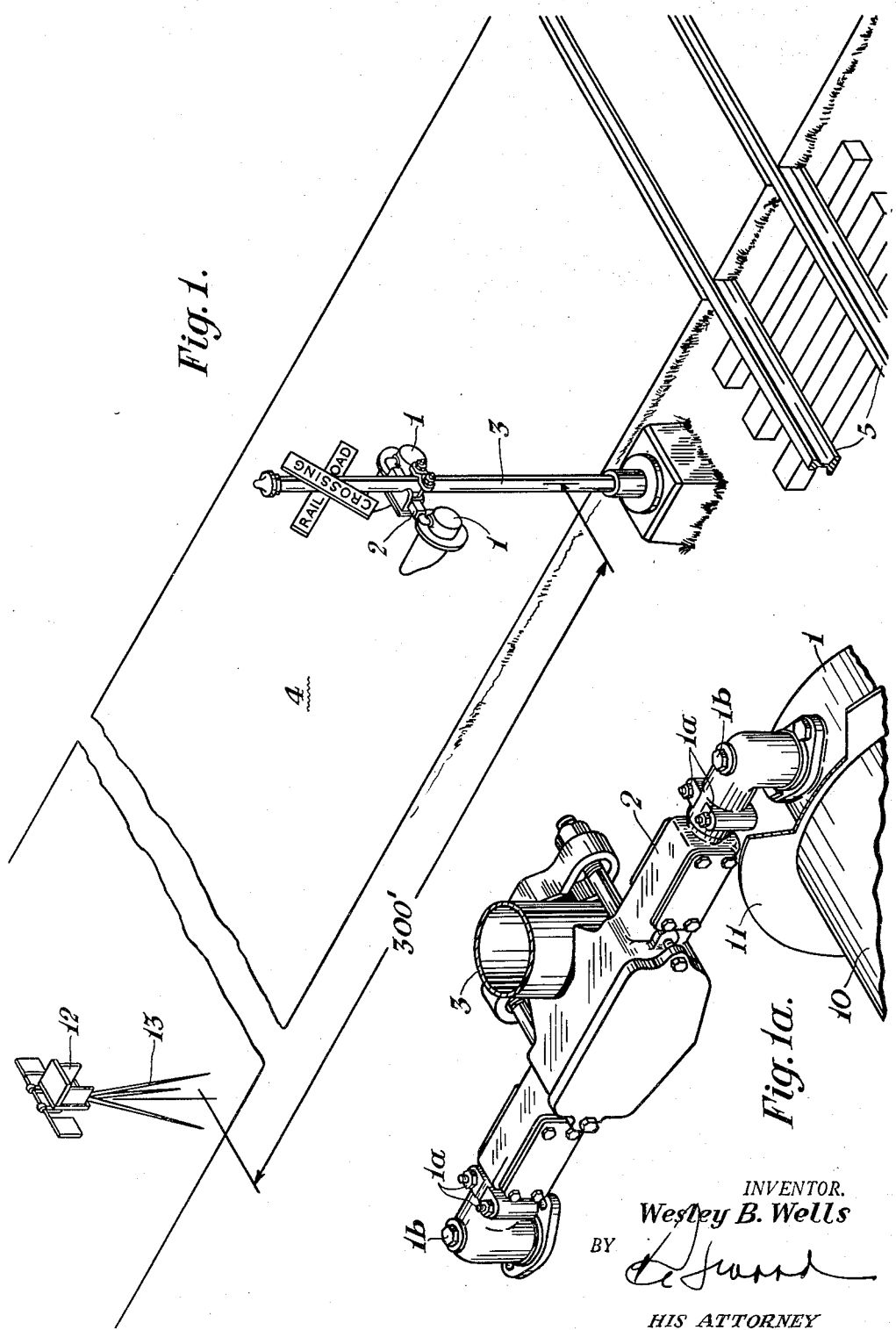
INVENTOR.
Wesley B. Wells
BY
HIS ATTORNEY Aug. 29, 1950            W. B. WELLS            2,520,866
METHOD OF ALIGNING HIGHWAY CROSSING SIGNAL LAMPS
Filed March 27, 1948            4 Sheets-Sheet 2
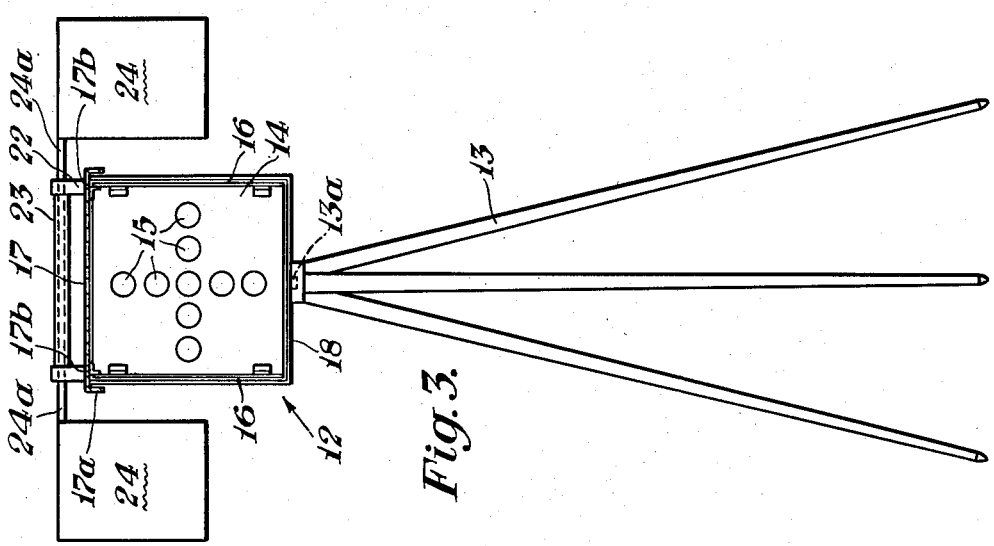
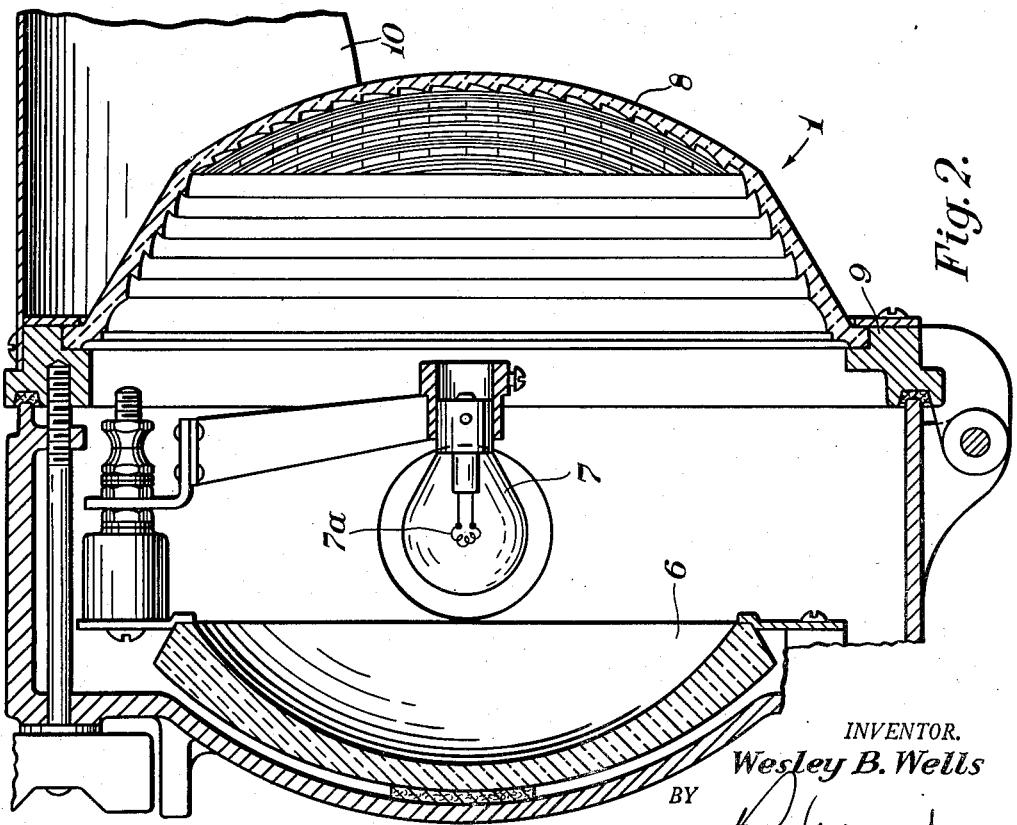
INVENTOR.
Wesley B. Wells
BY
HIS ATTORNEY Aug. 29, 1950      W. B. WELLS      2,520,866
METHOD OF ALIGNING HIGHWAY CROSSING SIGNAL LAMPS
Filed March 27, 1948      4 Sheets-Sheet 3
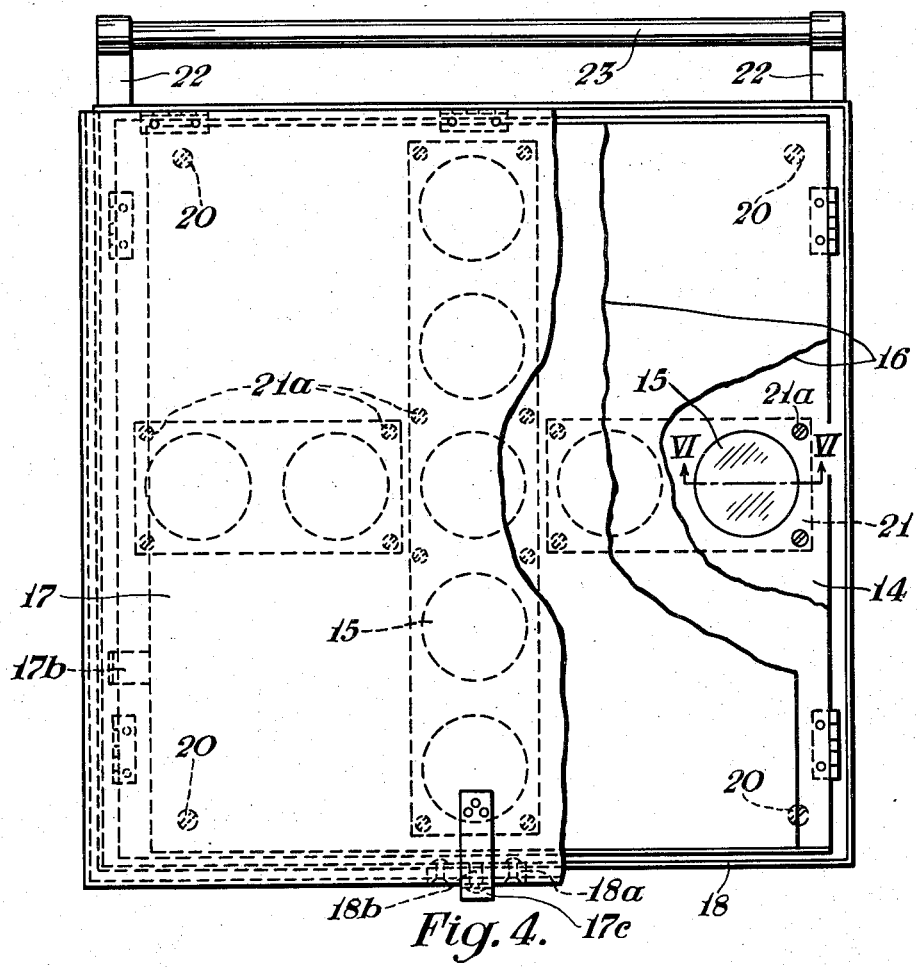
Fig. 4.
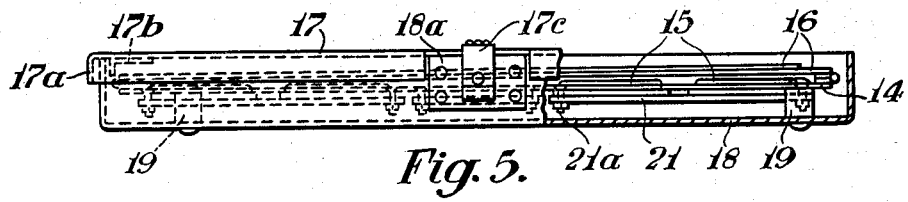
Fig. 5.
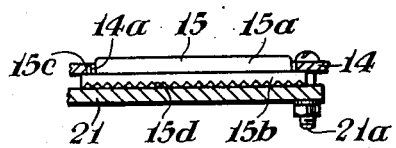
Fig. 6.
INVENTOR.
Wesley B. Wells
BY
HIS ATTORNEY Aug. 29, 1950 W. B. WELLS 2,520,866
METHOD OF ALIGNING HIGHWAY CROSSING SIGNAL LAMPS
Filed March 27, 1948 4 Sheets-Sheet 4

INVENTOR.
Wesley B. Wells
BY
HIS ATTORNEY

Patented Aug. 29, 1950

2,520,866

UNITED STATES PATENT OFFICE 2,520,866

METHOD OF ALIGNING HIGHWAY CROSSING SIGNAL LAMPS

Wesley B. Wells, Wilkinsburg, Pa., assignor to The Union Switch & Signal Company, Swissvale, Pa., a corporation of Pennsylvania Application March 27, 1948, Serial No. 17,458

1 Claim. (Cl. 88—14)

My invention relates to the aligning of lamps, and particularly to the aligning of signal lamps which are required to give a signal indication to a point spaced from the lamp itself by a considerable distance.

My invention is illustrated herein as applied to a highway crossing signal lamp, and it has certain features of particular utility in connection with such a lamp. Other features are of general utility in connection with other types of lamps.

Most highway crossing signal lamp units manufactured in the past several years have been built in accordance with the specifications of the Association of American Railroads. Such signal lamp units include a reflector and a lamp bulb of the precision type with its filament located and fixed in position at the focal point of the reflector. The reflector and lamp produce a substantially parallel beam of light. This beam passes through a spreading lens or cover glass to give the required distribution of light over the area where it is desired that the signal be received. Such a signal lamp unit is shown, for example, in Letters Patent of the United States No. 1,878,273, granted September 20, 1932 to A. W. Fisher and W. B. Wells, for Light Signal. Such lamps have commonly been provided with an adjustable support such as that shown in Letters Patent of the United States No. 2,054,871, issued to W. B. Wells on September 20, 1936, for Adjustable Supporting Structure for Light Signal Units and the Like.

In the past, this type of signal has usually been aligned by two men, one located at the signal and one in the approaching highway 300 or 400 feet from the signal. To align the signal, the door was left open so that the parallel beam from the reflector could be observed by the man in the highway. The alignment was accomplished by having the observer in the highway signal to the man at the lamp unit who adjusted the lamp support until the observer was in the center of the beam. This method of alignment required the time of two men, and was slow and awkward because of the difficulty of communication between the two men spaced some distance apart.

In order to avoid the necessity of using two men to align a signal lamp, some lamps were provided with sighting devices by which a man at the signal lamp could sight on a distant point and make sure that the parallel beam from the lamp would strike that point. The difficulty with this method of aligning a signal lamp lies in the fact that each lamp must be equipped with a sighting device and each sighting device must be aligned with its associated beam in a dark room at the time the lamp is manufactured. This adds a considerable expense to each lamp unit.

It is therefore an object of my invention to provide a method for aligning a lamp whereby the alignment may be accomplished by one man.

A further object of my invention is to provide an improved method for aligning a lamp with a sighting device carried by the lamp.

I accomplish these objects by providing a portable reflector, of a light, compact structure, which may be mounted at a point where it is desired that the beam from the lamp should strike. In aligning a highway crossing signal, for example, the reflector is mounted in the highway some distance from the signal, and is pointed toward the signal lamp. The lamp is then lighted and with the door open the lamp support is then adjusted until a reflection of maximum intensity is received at the signal lamp from the reflector.

The reflector is provided with three hinged panels which cover the reflector when it is being carried, and which unfold to form a hood to protect the reflector from outside light sources when it is in use. The reflector is provided with a hollow pipe handle which serves not only for carrying the reflector when folded, but also as a mounting for two red flags, which are used as a warning to motorists when the reflector is set up in a highway.

The portable reflector hereinabove referred to and hereinafter more fully described is the subject matter of a divisional application for Reflector Devices bearing Serial No. 64,506 and filed by me on December 10, 1948.

When it is desired to use the reflector for aligning a lamp with an associated sighting device, a target is mounted on the reflector whose distance and angle from the reflector center are the same as the distance and angle of the sighting device from the center of the signal lamp. The lamp is then aligned with the reflector by adjusting the lamp support. The sighting device is then aligned with the target by adjusting the mounting of the sighting device. The sighting device and the lamp being aligned, the sighting device may then be used to align the lamp with any desired point by adjusting the signal lamp support.

Other objects and characteristic features of my invention will become apparent as the description proceeds.

I shall describe two methods and one form of apparatus for carrying out my invention, and shall then point out the novel features thereof in the claim.

Figure 9:
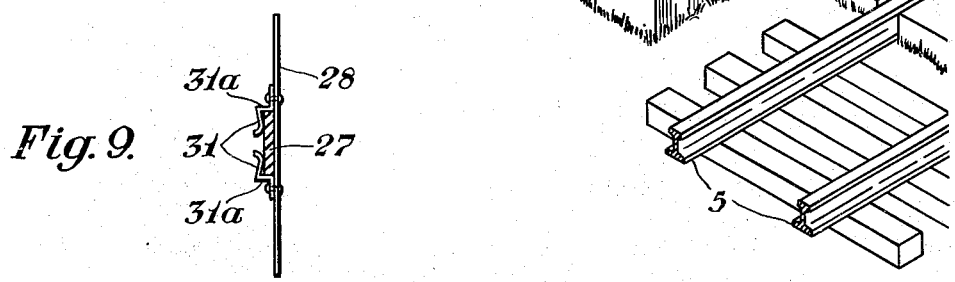
Figure 8:
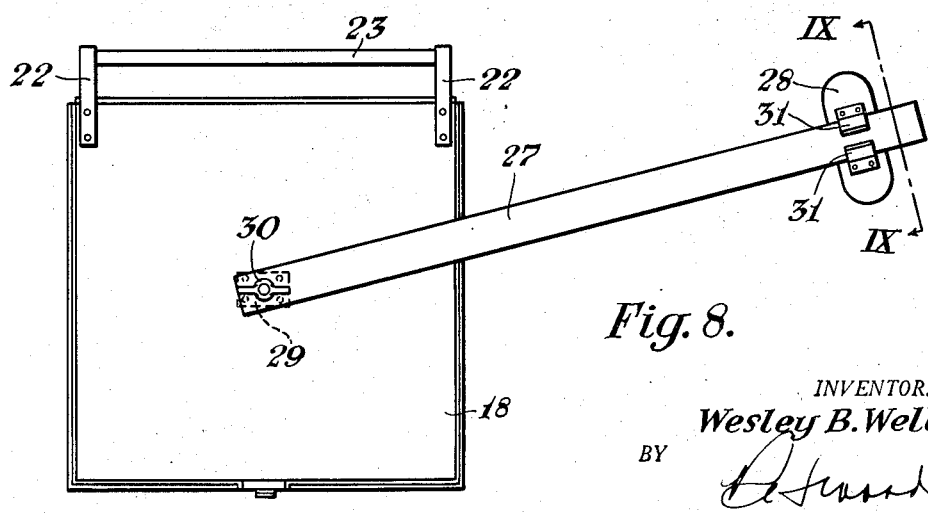

In the accompanying drawings, Fig. 1 is a perspective view of a signal lamp unit and one of my improved reflector units mounted for use in connection with my improved aligning method. Fig. 1a is a perspective view, on a larger scale, of the signal lamp mounting structure of Fig. 1. Fig. 2 is a cross-sectional view of the signal lamp unit of Figs. 1 and 1a. Fig. 3 is an elevational view of my improved reflector unit unfolded and mounted on a tripod. Fig. 4 is an elevational view on a larger scale of my improved reflector unit with the cover panels closed and portions of them broken away to better illustrate the structure beneath. Fig. 5 is a bottom view of the reflector unit as shown in Fig. 4. Fig. 6 is a cross-sectional detail view taken along the line VI—VI of Fig. 4. Fig. 7 is another perspective sketch illustrating the use of my combined reflector and target structure in aligning a signal provided with a sighting device. Fig. 8 is a rear elevational view of the casing of my combined reflector and target, showing the supporting structure for the target. Fig. 9 is a cross-sectional view taken on the line IX—IX of Fig. 8, looking in the direction of the arrows, and illustrating the manner in which the target is mounted on its supporting arm.

*Figs. 1 to 6*

Referring to Fig. 1, there is shown a highway crossing signal comprising a pair of signal lamp units 1 mounted on a cross arm 2, carried by a pole 3 alongside a highway 4 adjacent a grade crossing with a railway 5. The signal supporting structure is similar to that shown and described completely in my previous Patent No. 2,054,871. For present purposes, it is believed sufficient to state that this supporting structure includes adjusting nuts 1a, (see Fig. 1a) which when loosened, permit rotative adjustment of each signal lamp unit 1 about a horizontal axis through the cross arm 2, and an adjusting nut 1b, which when loosened, permit rotative adjustment of each signal lamp unit 1 about a vertical axis extending through the adjusting nut 1b.

Each signal lamp unit 1 comprises, as illustrated in Fig. 2, a reflector 6, a lamp bulb 7 mounted with its filament 7a at the focus of the reflector, and a spreading lens 8 mounted in a hinged door 9, which also carries a hood 10 and a background 11 (see Fig. 1a). The signal lamp unit illustrated herein is more completely shown and described in the patent to Fisher et al. No. 1,878,273, previously mentioned.

A portable reflector unit 12 (see Figs. 1 and 3), described and claimed in my aforesaid divisional application, is mounted in the highway 4 substantially at the most distant point where observation of the signal indication is desired. This may be 300 feet, as indicated in the drawing, or it may be a greater or smaller distance, as required by the local conditions. The reflector 12 is illustrated in detail in Figs. 3, 4, 5 and 6. It appears in Figs. 1 and 3 in its open position, ready for use, and in Figs. 4 and 5 in its folded or closed position, ready for carrying from one location to another.

The reflector unit 12 includes a reflector panel 14 carrying a plurality of reflector buttons 15. A pair of side panels or wings 16 are hinged at the opposite edges of the reflector panel 14. A top panel or cover 17 is hinged at the top edge of the reflector panel 14. The reflector panel 14 is mounted in a box 18 by means of four studs 19 which are attached to the box and screws 20 which extend through the reflector panel 14 and are threadedly received in the studs 19.

The top panel 17 is provided with a down turned rim portion 17a, which fits over the edges of the box 18 when the reflector unit is closed. The cover 17 is also provided with a pair of downwardly projecting lugs 17b. When the signal unit is open, as shown in Fig. 3, the upper edge of each of the side panels 16 is received between one of the lugs 17b and the rim portion 17a of the cover 17. (The front portion of rim 17a is broken away in Fig. 3 to permit better illustration of the parts behind it.) The top and side panels are thus latched together to form a hood which protects the reflector buttons 15 from sources of light other than the signal lamp toward which they are directed.

The reflector buttons 15 are of a well-known make, being of the type commonly used on highway signs and the like, having a relatively large acceptance angle and a narrow return beam. I prefer to use buttons so constructed that they will accept and reflect only light directed at the button from within an angle of 15° with the perpendicular. In other words, the button should have an acceptance angle of substantially 30°. As best shown in Fig. 6, each button 15 comprises a lens portion 15a and a base portion 15b, of somewhat greater diameter. The lens portion 15a projects through an aperture 14a formed in the reflector panel 14. Since the portions 15a and 15b of the lens are of different diameters, they form a shoulder 15c on the button 15. A backing plate 21 engages the button 15 and holds the shoulder 15c against the reflecting panel 14. The backing plate 21 may be supported on the panel 14 by any suitable means, such as the screws 21a. The reflector buttons 15 have a reflecting back surface 15d.

A reinforcing plate 18a is attached to the bottom of box 18 by any suitable means, for example, by spot welding. This reinforcing plate 18a is provided with a threaded aperture 18b for receiving a threaded mounting post 13a carried on the tripod 13. When the reflecting unit is closed for carrying, as shown in Figs. 4 and 5, a latch 17c on the top panel 17 engages the aperture 18b.

A pair of upwardly extending straps 22 are attached by suitable means to the upper corners of the box 18. The upper ends of the straps 22 are bent over to engage and hold a section of pipe 23, which serves as a handle for the reflector unit when it is in its closed position as illustrated in Figs. 4 and 5.

When the reflecting unit is mounted in the highway, the staffs 24a of a pair of signal flags 24 may be inserted in the opposite ends of the pipe handle 23, so as to warn approaching motorists of the presence of the reflector unit in the highway.

*Operation of Figs. 1 to 6*

When aligning the signal unit 1 in accordance with my invention, the portable reflector unit 12 is first set up in the highway substantially at the point where it is desired to receive the main beam of the signal. The reflector is preferably mounted substantially at the eye level of drivers of approaching vehicles. The reflecting unit is then directed at the signal. Since the reflector will accept light from an angle up to 15° on either side of a perpendicular line, the reflector unit may be readily directed at the signal by hand with sufficient accuracy so that a person at the signal may observe the reflection of the signal light in the reflector. Having mounted the reflector in the roadway and directed it at the signal unit, the operator returns to the signal lamp, and opens the hinged door 9 so that the parallel beam from the reflector 6 is not spread by the lens 8. He then lights the lamp bulb 7, and proceeds to adjust the mounting of the signal unit until the reflection which he gets from the reflector 12 is of maximum intensity. When this is accomplished, he tightens the adjustment, closes the door of the signal unit casing, and turns off the light 7. The alignment of the signal unit is then complete. The same process is then repeated for the other signal units 1.

The arrangement of the reflector buttons 15 in a cross-shaped formation aids materially in the use of my reflector. The presence of the horizontal and vertical rows of reflector buttons makes it easy for the operator to tell when the edge of the beam passes over the reflector surface. By noting the positions of the lamp unit at which the two edges of the beam are observed, the operator may split the difference between those positions and thereby make sure that the center of the beam is directed at the reflector. Any other arrangement of reflector buttons which includes a horizontal row and a vertical row may be used, but the cross-shaped arrangement of one horizontal row and one vertical row crossing at the center of the reflector is believed to be the optimum arrangement.

*Figs. 7, 8 and 9*

In certain instances, it may be undesirable to use the method of lamp alignment just described, either because of an extreme distance between the signal and the point where the signal is to be received, or because heavy traffic conditions make it impractical to leave an unattended reflector unit standing in the roadway, or for other reasons. For example, railway signals, as distinguished from crossing signals, are sometimes required to be visible for as much as a mile. In such cases, it may be very inconvenient for the operator aligning the signal to mount the reflector a mile away and then return to the signal to align it. When such conditions are encountered, the method and apparatus for aligning a signal disclosed in Figs. 7, 8 and 9 may be used.

In Fig. 7, there are shown a pair of signal units 1, which may be the same as the signal units 1 of Fig. 1. A sighting device, illustrated as a telescope 25, is attached to the background of signal 1 by means of an adjustable mounting clamp 26. Any suitable universal mounting clamp may be used. The reflector 12 is illustrated in Fig. 7 as being mounted much closer to the signal lamp 1 than was the case in Fig. 1 and off the highway out of the way of traffic. In Fig. 7, a distance of 50 feet is illustrated, but greater or smaller distances may be used. An extension arm 27 is mounted on the reflector 12, and carries a target 28.

A reinforcing plate 29 is attached by suitable means, as by spot welding, to the back of the reflector box 18. This reinforcing plate is provided with a suitable threaded aperture to receive a thumb screw 30, which passes through a suitable aperture in the extension arm 27, and holds the arm 27 in any desirable angularly adjusted position with respect to the reflector box 18. The arm 27 is illustrated as being a flat bar of rectangular cross section. A pair of spring clamps 31 are riveted or otherwise suitably attached to the back of target 28, so that the target may slide along the arm 27 and be frictionally held in any adjusted position. It should be noted that the spring clamps 31 have flat portions 31a which engage the upper and lower sides of the bar 27 and therefore prevent rotation of the target 28 with respect to the bar.

*Operation of Figs. 7 to 9*

In order to align a lamp using the apparatus of these three figures, an operator first attaches a portable sighting device such as the telescope 25 to the background or other part of the signal unit which moves concurrently with the signal lamp as the latter is adjusted. The operator then carefully measures the lateral and vertical distances X and Y between the center of the signal unit and the sighting device 25. The reflector unit 12 is then set up at any convenient distance and in any convenient direction from the signal lamp 1. The extension arm 27 is attached to the reflector unit 12, and its angular position and the position of target 28 of the arm 27 are adjusted so that the horizontal and vertical distances between the center of the reflector panel and the target 28 are the same as the horizontal and vertical distances between the center of signal lamp 1 and the telescope 25. The operator then returns to the signal lamp and, after swinging the hinged lens cover aside and turning on the lamp, adjusts the signal support so that a reflection of maximum intensity is received at the signal from the reflector 12. The direction of the parallel beam from the signal lamp to the reflector is then accurately established. The lens cover is then closed to restore the background to its normal position. The mounting 26 of the sighting device 25 is then adjusted so that the sighting device is lined up with the target 28. This insures that the sighting device 25 is parallel with the beam from the signal lamp 1. The signal lamp 1 is then aligned with any desired remote point by adjusting its mounting structure until the sighting device 25 is aligned with that point. It should be noted that in using this method, the reflector 12 may be set up at a convenient point, fairly close to the signal lamp, and out of the path of traffic.

This method may also be used when the sighting device is built into the signal lamp unit and it is desired to either adjust or check the parallelism between the sighting device and the beam from the signal lamp.

Although I have herein shown and described only two methods embodying my invention, it is understood that various changes and modifications may be made therein within the scope of the appended claim without departing from the spirit and scope of my invention.

Having thus described my invention, what I claim is:

The method of aligning a signal lamp which includes a lamp and reflector unit for producing a parallel beam of light and a lens for spreading the beam, comprising the steps of mounting a portable reflector at a point spaced from the lamp, directing the portable reflector at the lamp, removing the lens, lighting the lamp, adjusting the lamp and reflector unit until the reflection from the portable reflector is at its maximum intensity at the lamp, and replacing the lens.

WESLEY B. WELLS.

REFERENCES CITED

The following references are of record in the file of this patent:

UNITED STATES PATENTS

| Number | Name | Date |
| --- | --- | --- |
| 1,227,528 | Chidley | May 22, 1917 |
| 1,266,525 | Otte | May 14, 1918 |
| 1,457,269 | Rexford | May 29, 1923 |
| 1,598,280 | Hull | Aug. 31, 1926 |
| 1,615,621 | Goodnow | Jan. 25, 1927 |
| 1,680,545 | Jewett | Aug. 14, 1928 |
| 2,109,286 | Cubby | Feb. 22, 1938 |
| 2,124,146 | Miller | July 19, 1938 |
| 2,198,836 | Patton | Apr. 30, 1940 |
| 2,214,473 | Mann | Sept. 10, 1940 |
| 2,366,430 | Benton | Jan. 2, 1945 |
| 2,405,441 | Martin | Aug. 6, 1946 |